Jan. 17, 1928. 1,656,666
H. C. DETJEN
PNEUMATIC HORSE COLLAR
Filed Sept. 6, 1927 2 Sheets-Sheet 1
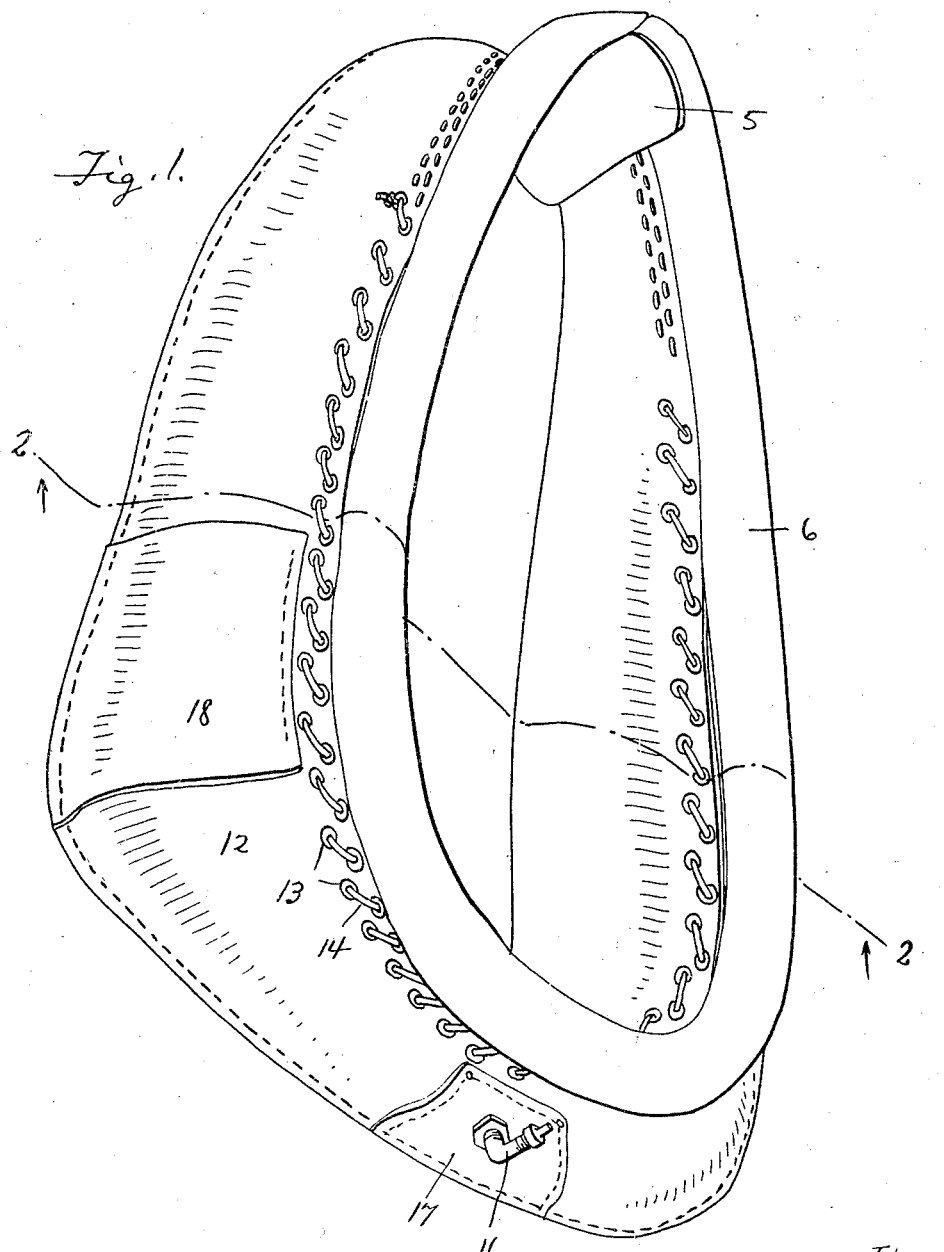
Inventor
Henry C. Detjen
Clarence A. O'Brien
Attorney Jan. 17, 1928.
H. C. DETJEN
1,656,666
PNEUMATIC HORSE COLLAR
Filed Sept. 6, 1927
2 Sheets-Sheet 2
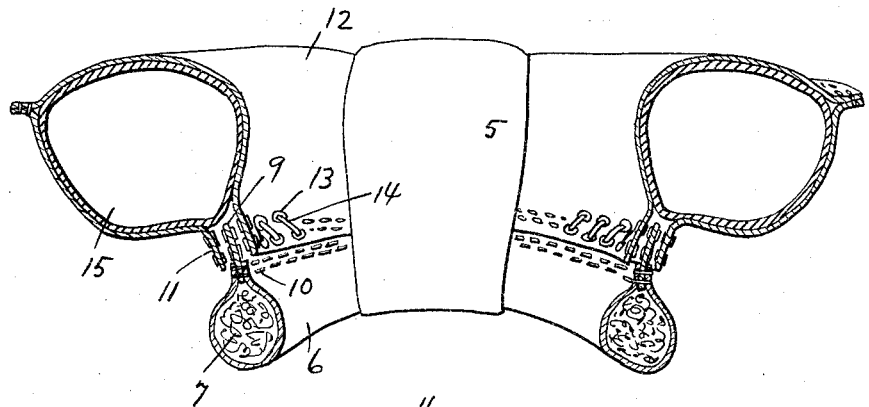
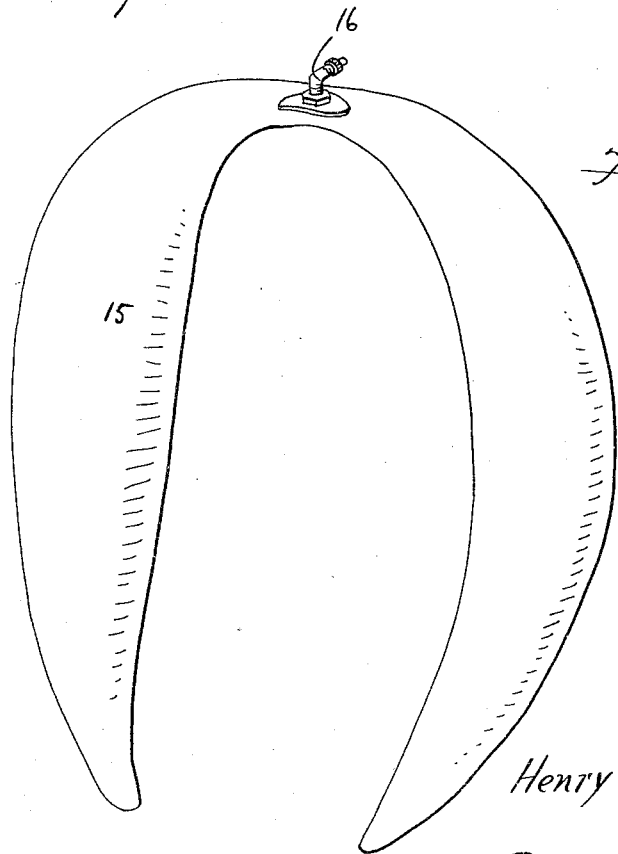
Inventor
Henry C. Detjen
By Clarence A. O'Brien
Attorney Patented Jan. 17, 1928.

1,656,666

UNITED STATES PATENT OFFICE.

HENRY C. DETJEN, OF FREDERICKSBURG, TEXAS.

PNEUMATIC HORSE COLLAR.

Application filed September 6, 1927. Serial No. 217,773.

The present invention relates to a pneumatic horse collar and has for its prime object to provide a structure of this nature which serves to even the pressure on the animal's shoulders, and neck.

Another important object of the invention resides in the provision of a collar, the weight of which is less than that of the ordinary padded collar now in common use.

Another important object of the invention resides in the provision of a collar which will allow injured shoulders of the animal to readily heal.

Another important object of the invention resides in the provision of a pneumatic collar of this nature which in the case of deformed shoulders of the animal will conform to the deformity and thus not cause sores and the like.

A still further important object of the invention resides in the provision of a collar of this nature which eliminates the use of the ordinary collar pad.

Another and equally important object of the invention resides in the provision of a structure of this nature which is exceedingly simple, inexpensive to manufacture, easy to assemble and disassemble, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a perspective view of the collar embodying the features of my invention, Figure 2 is a sectional view therethrough taken substantially on the line 2—2 of Figure 1, and, Figure 3 is a perspective view of the inner tube.

Referring to the drawings in detail, it will be seen that the body of the collar is continuous by being secured together at its upper ends through a top pad or reinforcing portion 5. This body portion comprises a casing 6 of leather or any other suitable material with padding 7 therein. The longitudinal edges of the casing are stitched together and to a sheet of similar material 9 as at 10. This sheet 9 is provided with a plurality of eyelets 11. A casing 12 of larger cross sectional area than the casing 6 has its longitudinal edges one on each side of the strip 9 and is provided with eyelets 13 so that lacings 14 may be passed therethrough and through the eyelets 11 to secure the casing 10 to the strip 9. This casing 12 is adapted to house an inner tube 15 of the shape shown in Figure 3 provided with a valved L-shaped conduit 16 adapted to project through the bottom of the casing 12 and a reinforcement sheet 17 thereon. Reinforcing sheets 18 are provided on the side portions of the casing 12.

It is thought that the construction, utility, and advantages of this invention will now be quite apparent to those skilled in this art without a more detailed description thereof.

It will be seen that the pneumatic casing 12 with its pneumatic tube 15 will take the place of the ordinary pad and conform to the shape of the shoulders of the animal and prevent injury thereto besides making the collar comparatively light, yet sufficiently strong for all practical purposes.

The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

A horse collar of the class described comprising a body portion including a casing having padding therein and provided with longitudinal edges, a strip between the longitudinal edges, said longitudinal edges being stitched to the strip, said strip being provided with eyelets, a pneumatic casing having its longitudinal edges straddling the strips and provided with eyelets, lacing extending through the eyelets to secure the pneumatic casing to the strip, and an inner tube in the pneumatic casing.

In testimony whereof I affix my signature.

HENRY C. DETJEN.